(12) United States Patent
Uszkoreit

(10) Patent No.: US 11,625,392 B2
(45) Date of Patent: *Apr. 11, 2023

(54) QUERY COMPOSITION SYSTEM

(71) Applicant: Google LLC, Mountain View, CA (US)

(72) Inventor: Jakob D. Uszkoreit, Portola Valley, CA (US)

(73) Assignee: GOOGLE LLC, Mountain View, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 16/931,995

(22) Filed: Jul. 17, 2020

(65) Prior Publication Data

US 2020/0349150 A1 Nov. 5, 2020

Related U.S. Application Data

(63) Continuation of application No. 16/162,931, filed on Oct. 17, 2018, now Pat. No. 10,754,850, which is a
(Continued)

(51) Int. Cl.
*G06F 16/00* (2019.01)
*G06F 16/242* (2019.01)
(Continued)

(52) U.S. Cl.
CPC .......... *G06F 16/242* (2019.01); *G06F 16/285* (2019.01); *G06F 16/3322* (2019.01);
(Continued)

(58) Field of Classification Search
None
See application file for complete search history.

(56) References Cited

U.S. PATENT DOCUMENTS

| 7,603,360 B2 | 10/2009 | Ramer |
| 8,359,237 B2 | 1/2013 | Dalai |

(Continued)

FOREIGN PATENT DOCUMENTS

| CN | 103646070 | 3/2014 |
| CN | 103970891 | 8/2014 |

(Continued)

OTHER PUBLICATIONS

China National Intellectual Property Administration; Notification of Second Office Action issued in Application No. 201680029985.8; 41 pages; dated Nov. 3, 2021.
(Continued)

*Primary Examiner* — Debbie M Le
(74) *Attorney, Agent, or Firm* — Gray Ice Higdon

(57) ABSTRACT

Methods, systems, and apparatus for generating data describing context clusters and context cluster probabilities, wherein each context cluster includes query inputs based on the input context for each of the query inputs and the content described by each query input, and each context cluster probability indicates a probability that at a query input that belongs to the context cluster will be selected by the user, receiving, from a user device, an indication of a user event that includes data indicating a context of the user device, selecting as a selected context cluster, based on the context cluster probabilities for each of the context clusters and the context of the user device, a context cluster for selection input by the user device, and providing, to the user device, data that causes the user device to display a context cluster selection input that indicates the selected context cluster for user selection.

13 Claims, 6 Drawing Sheets

Related U.S. Application Data continuation of application No. 14/867,968, filed on Sep. 28, 2015, now Pat. No. 10,146,829.

(51) Int. Cl.
*G06F 16/28* (2019.01)
*G06F 16/951* (2019.01)
*G06F 16/332* (2019.01)
*G06F 16/9537* (2019.01)
*G06F 17/18* (2006.01)

(52) U.S. Cl.
CPC ........ *G06F 16/951* (2019.01); *G06F 16/9537* (2019.01); *G06F 17/18* (2013.01)

(56) References Cited

U.S. PATENT DOCUMENTS

| | | | |
|---|---|---|---|
| 8,396,864 B1 | 3/2013 | Harinarayan | |
| 8,645,390 B1 | 2/2014 | Oztekin | |
| 8,874,592 B2 | 10/2014 | Flake | |
| 8,892,597 B1 | 11/2014 | Strohman | |
| 8,930,391 B2 | 1/2015 | Chakrabarti | |
| 9,043,296 B2* | 5/2015 | Mital | G06F 16/90328 707/705 |
| 9,395,882 B2 | 7/2016 | Berger | |
| 9,743,243 B1* | 8/2017 | Li | H04M 1/72403 |
| 2009/0313228 A1 | 12/2009 | Grandhi | |
| 2010/0076979 A1 | 3/2010 | Wang | |
| 2010/0082434 A1* | 4/2010 | Chen | G06F 16/9535 705/14.55 |
| 2010/0211588 A1 | 8/2010 | Daxin et al. | |
| 2011/0125678 A1 | 5/2011 | Partridge | |
| 2012/0030227 A1 | 2/2012 | Mital et al. | |
| 2012/0158685 A1 | 6/2012 | White | |
| 2014/0181100 A1 | 6/2014 | Ramer et al. | |
| 2014/0379689 A1 | 12/2014 | Huffman et al. | |
| 2015/0074543 A1 | 3/2015 | Edwin et al. | |
| 2015/0169739 A1 | 6/2015 | Linsley | |
| 2015/0324435 A1* | 11/2015 | Hsieh | G06F 16/951 707/767 |

FOREIGN PATENT DOCUMENTS

| | | |
|---|---|---|
| JP | 2011138366 | 7/2011 |
| RU | 2541890 C2 | 2/2015 |

OTHER PUBLICATIONS

Intellectual Property India; Examination Report issued in Application No. 201847004559; 7 pages; dated Jan. 1, 2021.
China National Intellectual Property Administration; Notification of First Office Action issued in Application No. 201680029985.8; 36 pages; dated May 6, 2021.
International Preliminary Report on Patentability issued in International Application No. PCT/US2016/053937, dated Apr. 12, 2018, 11 pages.
International Search Report and Written Opinion issued in International Application No. PCT/US2016/053937, dated Apr. 12, 2018, 16 pages.
Ziad et al. "Finding trending local topics in search queries for personalization of a recommendation system," Knowledge Discovery and Data Mining, ACM, Aug. 12, 2012, 9 pages.
China National Intellectual Property Administration; Notice of Allowance issued in Application No. 201680029985.8; 6 pages; dated Dec. 28, 2021.

\* cited by examiner

QUERY COMPOSITION SYSTEM

CROSS-REFERENCE TO RELATED APPLICATIONS

This application is a continuation application of, and claims priority to, U.S. patent application Ser. No. 16/162,931, titled "Query Composition System," filed on Oct. 17, 2018, which application is a continuation application of, and claims priority to, U.S. patent application Ser. No. 14/867,968, now U.S. Pat. No. 10,146,829, titled "Query Composition System," filed on Sep. 28, 2015. The disclosure of the foregoing applications are incorporated herein by reference in their entirety for all purposes.

BACKGROUND

The advent of cloud based services, search engines, and other services and media has drastically expanded the utility of user devices over the last decade. Many user devices, especially mobile devices and smartphones, now provide services and applications in addition to voice and data access. Additionally, the Internet, capable of being accessed on user devices, is a global network of computers that provide information in response to requests. This information is in the form of electronic resources, such as, for example, web pages, electronic files, or other resources. Search engines organize these resources according to the information they contain, allowing users to submit search queries to find resources containing information pertaining to the particular query.

In many instances, a user may find a convenience in providing a search query without being required to include all of the characters of the search query. Accordingly, many systems now provide query suggestions as a user is typing in a query.

SUMMARY

This specification relates to selecting and providing query suggestions to a user device. In some implementations, a set of queries (e.g., movie times, movie trailers) related to a particular topic (e.g., movies) may be grouped into context clusters. Given a context of a user device for a user, one or more context clusters may be presented to the user when the user is initiating a search operation, but prior to the user inputting one or more characters of the search query. For example, based on a user's context (e.g., location, date and time, indicated user preferences and interests), when a user event occurs indicating the user is initiating a process of providing a search query (e.g., opening a web page associated with a search engine), one or more context clusters (e.g., "movies") may be presented to the user for selection input prior to the user entering any query input. The user may select one of the context clusters that are presented and then a list of queries grouped into the context cluster may be presented as options for a query input selection.

In general, one innovative aspect of the subject matter described in this specification can be embodied the actions of accessing, by a data processing apparatus, query data indicating query inputs received from user devices of a plurality of users, the query data also indicating an input context that describes, for each query input, an input context of the query input that is different from content described by the query input; grouping, by the data processing apparatus, the query inputs into context clusters based, in part, on the input context for each of the query inputs and the content described by each query input; determining, by the data processing apparatus, for each of the context clusters, a context cluster probability based on respective probabilities of entry of the query inputs that belong to the context cluster, the context cluster probability being indicative of a probability that at least one query input that belongs to the context cluster and provided for an input context of the context cluster will be selected by the user; and storing, in a data storage system accessible by the data processing apparatus, data describing the context clusters and the context cluster probabilities.

Another innovative aspect of the subject matter described in this specification can be embodied the actions of receiving, from a user device, an indication of a user event that includes data indicating a context of the user device, wherein the context is independent of a query input at the user device; accessing the data describing context clusters and context cluster probabilities, wherein each context cluster includes query inputs based, in part, on the input context for each of the query inputs and the content described by each query input, and each context cluster probability is indicative of a probability that at least one query input that belongs to the context cluster and provided for an input context of the context cluster will be selected by the user; selecting as a selected context cluster, based on the context cluster probabilities for each of the context clusters and the context of the user device, a context cluster for selection input by the user device; and in response to the selection, providing, to the user device, data that causes the user device to display a context cluster selection input that indicates the selected context cluster for user selection.

Particular implementations of the subject matter described in this specification can be implemented so as to realize one or more of the following advantages. Implementations of the subject matter described below allows for the user to provide a search query without being required to input any characters as part of the search query and without the user being presented with an overly large array of query input selections. Consequentially, only the most relevant and likely query inputs for the user, in that particular context, are selectable by the user without a query input by the user.

Each context cluster includes a group of one or more queries, the grouping being based on the input context (e.g., location, date and time, indicated user preferences and interests) for each of the query inputs, when the query input was provided, and the content described by each query input. One or more context clusters may be presented to the user for input selection based on a context cluster probability, which is based on the context of the user device and respective probabilities of entry of the query inputs that belong to the context cluster. The context cluster probability is indicative of a probability that at least one query input that belongs to the context cluster will be selected by the user. Upon selection of one of the context clusters that is presented to the user, a list of queries grouped into the context cluster may be presented as options for a query input selection. This advantageously results in individual query suggestions for query inputs that belong to the context cluster but that alone would not otherwise be provided due to their respectively low individual selection probabilities. Accordingly, users' informational needs are more likely to be satisfied.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
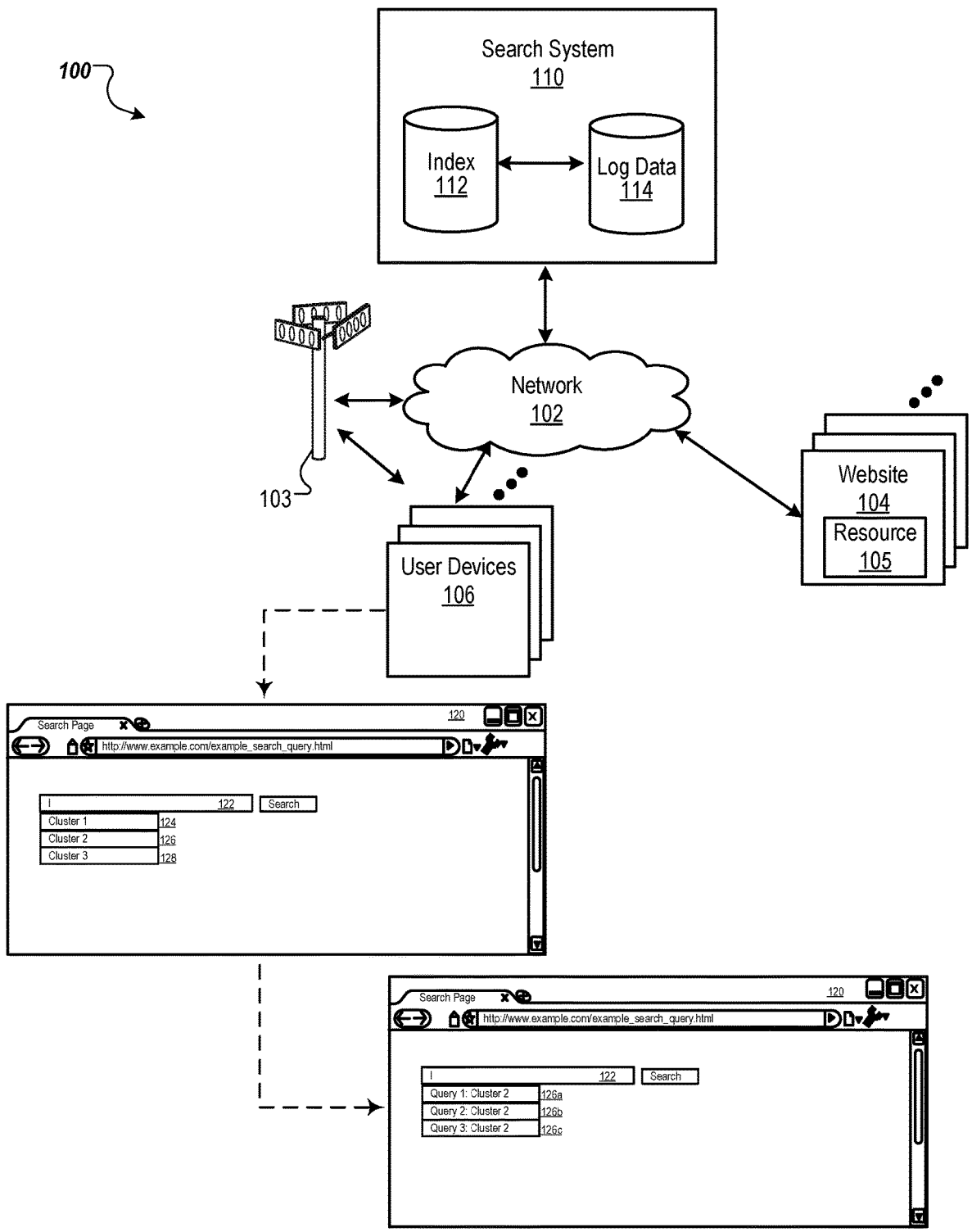
FIG. 1 is a diagram of an example environment in which context clusters may be presented to and utilized by a user.

FIG. 1 is a block diagram of an environment 100 in which context clusters may be presented and utilized by a user. A computer network 102, such as the Internet, provides for data communication between electronic devices and systems. Examples of such electronic devices and systems include web sites 104 and user devices 106. The computer network 102 may also include, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

A user device 106 is an electronic device that is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. The user devices 106 may communicate over the networks 102 and 103 by means of wired and wireless connections.

To facilitate searching of these resources 105 and other information derived from the resources, the search system 110 identifies the resources by crawling the publisher websites 104 and indexing the resources provided by the publisher websites 104. The resources are indexed and the index data are stored in an index 112. Although the index 112 is depicted as a single entity, it can include multiple parts and different indexes.

The user devices 106 submit search queries to the search system 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search system 110, or some other identifier that identifies the user device 106 or the user using the user device.

In response to the search request, the search system 110 uses the index 112 to identify resources and other information that are relevant to the queries. The search system 110 identifies the resources and other information in the form of search results, answers, knowledge cards, etc., and returns data describing the responsive information to the user devices 106 in a search results page resource. A search result is data generated by the search system 110 that identifies a resource or provides information that satisfies a particular search query, which is a command input for the search system 110. Other information, such as answers and knowledge cards, may include facts derived from the resources, and optionally may also include links to the resources from which the facts were derived.

The search results are ranked based on scores related to the resources identified by the search results. The user devices 106 receive the search results pages and render the pages for presentation to users according to the rank.

The queries submitted during the search sessions are stored in log data 114. In particular, the log data 114 stores queries for search sessions by a set or subset of users. The log data 114 also includes data describing an input context for each query input. An input context of the query input is different from content described by the query input in that an input context describes the circumstance surrounding the input of the query input. The circumstances are independent of the actual content described by the query input.

For example, the input context for a particular query may include one or more of the location of the user device 106, the time and date the query was provided, and preferences and interests of the particular user. Preferences and interests of the user include data describing user interactions for the user's particular user device. The preferences and interests may be provided explicitly or implicitly. Explicit indications occur when the user particularly identifies topics of interests, such as sports, travel, or video games in a user profile. Implicit indications are derived from the content consumed by the user. Other ways of determining users' interests can also be used.

As further described below, when a particular user event occurs where there is an indication that the user is initiating a search query, for example, when a user on a user device 106 accesses a search engine website in a web browser, context cluster selection inputs may be presented to the user of the user device 106. A context cluster is a grouping of queries that are related at least by a similar input context, and optionally based on query similarity, as will be described in more detail below.

A user context associated with the user device 106 (e.g., location, time of day, user preferences and preferences) may be factored in to determining whether to present one or more context clusters and which context clusters to present to the user device 106. The context clusters 124, 126, and 128 may be presented, for example, in a search engine website 120 when the user event is determined to have occurred.

If the user selects, for example, context cluster 2 (126), then the queries that are grouped within context cluster 2 may be presented to the user as query input selection options. The user may select one of the query input selections, which include Query 1: Cluster 2 (126a), Query 2: Cluster 2 (126b), and Query 3: Cluster 2 (126c), and when a selection occurs, the query input selection is initiated as a query in the query input area 122. For example, the three queries 126a, 126b and 126c may be "movie showtimes,"

"movie trailers," and "MegaPlex theater seating" if a query cluster generated from queries submitted by users near a particular theater—MegaPlex—was selected by the user.

Figure 2:
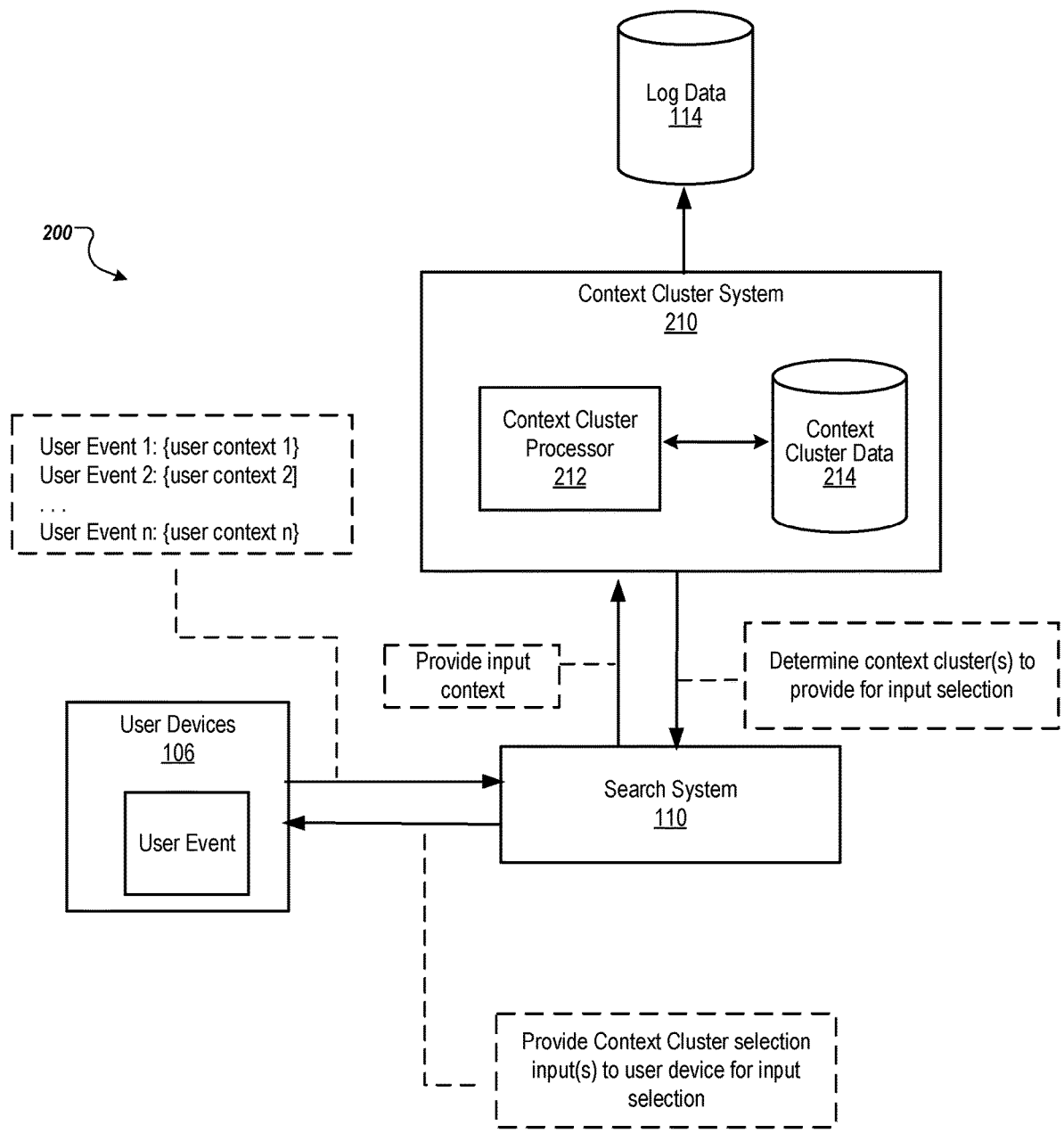
FIG. 2 is a system flow diagram for selecting and providing context clusters to a particular user device for input selection.

FIG. 2 is a system flow diagram 200 for selecting and providing context clusters to a particular user device 106 for input selection. A context cluster system 210 may access the log data 114 to group queries into clusters based on the input context associated with each of the queries and, optionally, to content of each query. For example, the context cluster processor 212, which may be a computer or collection of computers programmed to perform the options described below, may access the information in the log data 114 to determine the input context associated with each query, and the context clusters determined by the context cluster processor 212 may be stored as context cluster data 214.

For example, an input context for a group of queries may indicate that the queries are provided in an area within or near a mixed use complex (referred to herein as "MegaPlex") that includes a department store, restaurants, and a movie theater. Based on the input context being the same or similar, i.e., submitted from within an area surrounding a location, the queries may be grouped into a context cluster.

The queries may also be grouped based on the content of the queries, such as the characters included in the query and/or topic or subject of the query. For example, assume that five queries provided in the area are "movie times," "movie trailers," "Atlanta Braves," "restaurant menus," and "restaurant reservations." Based on the input context of each of these queries and the content of the queries, "movie times" and "movie trailers" may be placed in a context cluster (e.g., movies), and "restaurant menus" and "restaurant reservations" may be placed in a different context cluster (e.g., restaurants). However, "Atlanta Braves" may not be placed in either of these context clusters, or it may be used to create its own context clusters, because the characters and/or keywords of the query and topic associated with the query (e.g., sports) may not define content that is determined to be similar to the content of the other queries assigned to the other context clusters.

Additionally, other queries that include the same topics or have a level of similarity to queries in a context cluster may be added to the context cluster. For example, queries for times and trailers of particular movies may be grouped into the context cluster with "movie times" and "movie trailers." Further, each query in the context cluster may include a sub group that includes all query input selections that are significantly similar to one another and/or include the same keywords (e.g., "movie times," "movie show times," "movie time options," etc.)

Further, additional input contexts may be consider for grouping and creating context clusters, such as the time and day particular queries are provided and/or similarity of interests and preferences of the users providing the queries. For example, queries provided within or near the MegaPlex on Friday evenings between 6-10 PM may be grouped into a first context cluster, and queries provided within or near the MegaPlex on Saturday between noon and 6:00 PM may be grouped into another context cluster, and so on.

In some implementations, the grouping of query inputs into context clusters includes determining a level of similarity of the input context between each of the queries. For example, queries that were provided from the same location or at the same date and time may be determined to have a higher level of similarity of the input context with one another than between queries that were provided from different locations and/or dates and times. A threshold may be used to provide an indication that the input context of two or more query inputs include a sufficient level of similarity to one another.

Additionally, for each of the query inputs associated with each of the input contexts that include a level of similarity (e.g., a threshold), a level of similarity may be determined between the content of each of the query inputs. For example, queries that are related to the same topic (e.g., movies, sports, news, etc.) or the same characters and/or keywords may be determined to have a higher level of similarity to one another than queries that are related to different topics or include different characters. A threshold may be used to provide an indication that two or more query inputs include a sufficient level of content similarity to one another when a similarity measure that measures the similarity of the content of the queries meets the threshold. When content similarity is also considered, query inputs that are similar in both input context and content (e.g., meet a threshold level of similarity in input context and a threshold level of similarity in content) may be grouped with one another in a context cluster.

The system 210 may determine a probability for each cluster. For example, the probability of entry for a given context of each of the queries in a cluster for that context may be aggregated for the context cluster to determine a context cluster probability. For example, from the query log data 114, the system 210 may determine a respectively likelihood for each query being submitted at a particular location during a particular time period for the context cluster. Alternatively, the likelihood of query entry regardless of context may be used. Whichever likelihood is used, the likelihoods of the queries that belong to the cluster may be summed to generate the context cluster probability. The context cluster probability for the context cluster may be compared to a threshold probability to determine whether or not to include the context cluster for input selection by the user, as described in more detail below.

When a user device 106 performs a user event to indicate the user is initiating a process of providing a search query (e.g., opening a web page associated with a search engine), the search system 110 and/or the context cluster system 210 may receive the context of the particular user device 106. For example, the user device 106, at the time of the user event, may provide the user device's 106 location and user interests and preferences, and the date and time may be included in the input context of the user.

In response to such an indication, the context cluster system 210 may access the context cluster data 214 to determine if one or more context clusters is to be provided to the user device 106 as an input selection. Because there may be multiple context clusters available, the context cluster probabilities are used to determine which context clusters a user is most likely to select. If the context of a user device exactly matches a context for a context cluster, then the context cluster probability may be used as the likelihood. Context clusters having likelihoods that meet a selection threshold may then be identified to the user. In some implementations, up to a maximum number of context clusters, e.g., four, may be identified for a user if more than the maximum number of context clusters meet the selection threshold.

In some implementations, various similarity measures may be used to determine the likelihood. For example, the location, date and time, and user preferences and interests may be input contexts that may be compared between the particular user's context and the input context of the queries obtained from log data 114. Additionally, in some implementations, the contexts may be weighted to determine the probability that the user will provide each query. For example, if one location for the query "movie show times" is the same as the input context of the user when the user event occurs, then there may be a higher probability that the user will provide the same query. However, if the user is not in the same location as the input context of the stored queries indicates, then the probability may decrease.

Further, a user query history may be provided by the user device 106 (or stored in the log data 114) that includes queries and contexts previously provided by the user, and this information may also factor into the probability that a user may provide a particular query or a query within a particular context cluster. For example, if the user that initiates the user event provides a query for "movie show times" many Friday afternoons between 4 PM-6 PM, then when the user initiates the user event on a Friday afternoon in the future between these times, the probability associated with the user inputting "movie show times" may be boosted for that user. Consequentially, based on this example, the corresponding context cluster probability of the context cluster to which the query belongs may likewise be boosted with respect to that user.

Once one or more context clusters are determined to be provided (e.g., meet an aggregate probability threshold), then the search system 110 and/or the context cluster system 210 may provide data to the user device that causes the user device to display selection inputs for the one or more context clusters. If a context cluster is selected at the user device 106, then queries within that context cluster are presented to the user device 106 for user selection as a query input. Alternatively, or in addition to displaying selection inputs, the user device may also provide audio feedback to describe the context clusters and prompt the user to make a selection of a context cluster.

In some implementations, the context clusters may have sub-context clusters and are arranged in a hierarchical form. For example, queries generally related to movies may be grouped in a context cluster for "movies." However, among the queries that belong to this context cluster, those with a similar input context for a particular sub-context (e.g., "movie A's trailer," "movie B's trailer," etc.) may include a sub-context cluster for "movie trailers;" queries for show times may be provided in another sub-context cluster for "movie show times" (e.g., "movie A's show times," "movie B's show times," etc.). Thus, if the user is presented with the context cluster of "movies," and selects the context cluster, then the user may be presented with a second tier of context clusters, which includes "movie trailers" and "movie show times." After the user selects one of these context cluster options at this tier, then the user may select a particular query that is grouped in each of these context clusters.

Alternatively, or in addition to displaying queries in response to a selection of a context cluster, the user device may also provide audio feedback to describe the queries of the context cluster and prompt the user to make a selection of a query.

Figure 3:
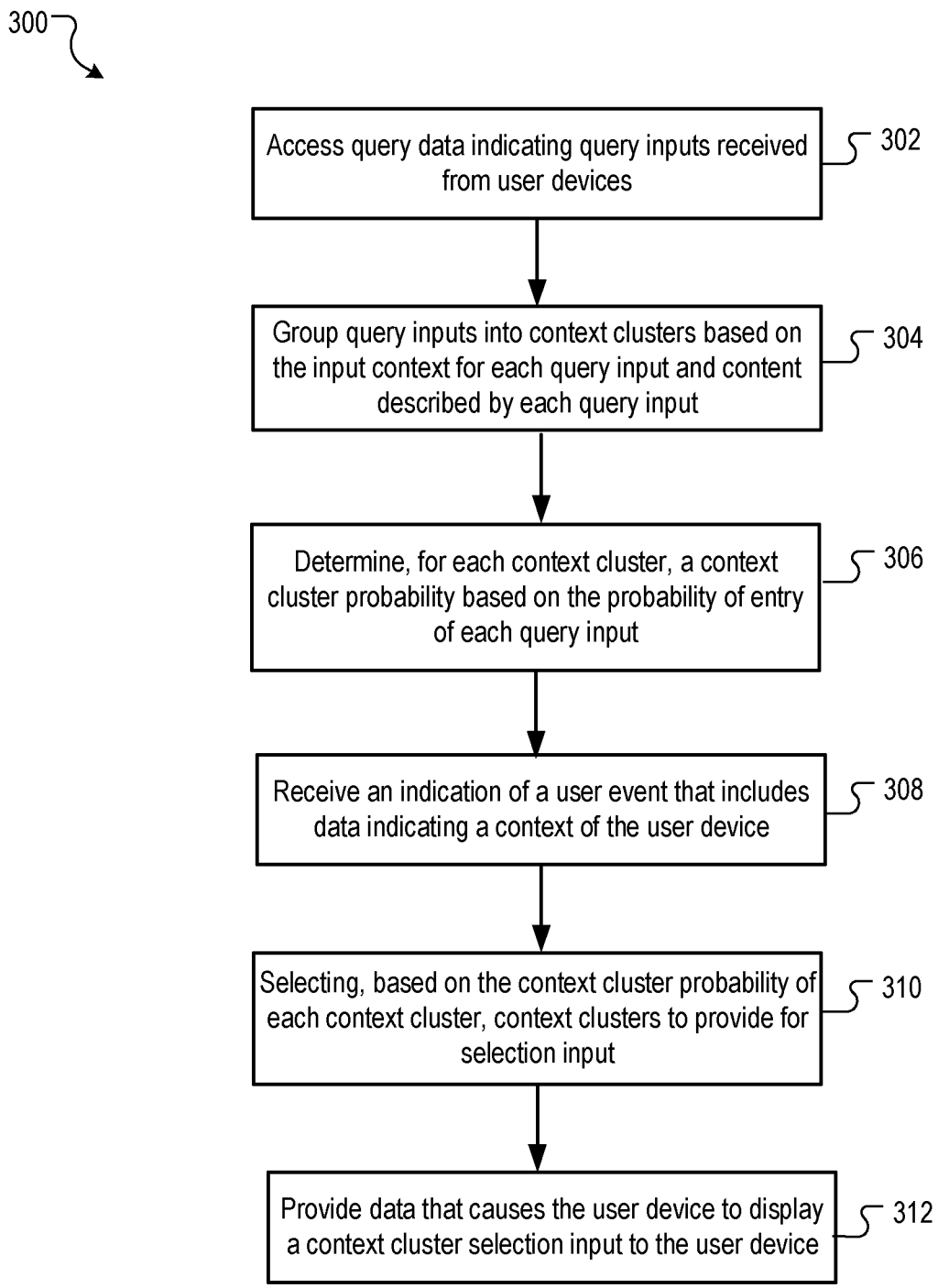
FIG. 3 is a flow diagram of a process for generating and providing one or more content clusters for selection input.

FIG. 3 is a flow diagram of a process 300 for generating and providing one or more content clusters for selection input. The process 300 can be implemented in the context cluster system 210 using one or more computers.

The process 300 accesses query data indicating query inputs received from user devices of a plurality of users (302). The query data also includes an input context that describes, for each query input, an input context of the query input that is different from content described by the query input. For example, as previously discussed, a context cluster system 210 may access the log data 114 to group queries into clusters based on the input context associated with each of the queries. A context cluster processor 212 may access the information in the log data 114 to determine the input context associated with each query, and the context clusters determined by the context cluster processor 212 may be stored in the context cluster data 214.

The process 300 groups query inputs into context clusters based, in part, on the input context for each of the query inputs and the content described by each query input (304). As previously described, an input context for a group of queries may indicate a location from which a query is submitted, and a particular time the query was submitted. Further, additional input contexts may be included for grouping and creating context clusters, such as the day particular queries are provided, respective preferences of the users providing the queries, and so on.

For grouping, the locations may be resolved to nearest addresses, or within a location grid; the time may be resolved to hour-long slots, e.g. 6 PM-7 PM, 7 PM-8 PM, and so on, such that a particular location may have up to 24 context clusters for a same context for a particular day. In other implementations, the grouping of query inputs into context clusters includes determining a level of similarity of the input context between each of the queries. A threshold may be used to provide an indication that the input context of two or more query inputs include a sufficient level of similarity to one another.

Additionally, a level of similarity may be determined between the content of each of the query inputs. For example, queries that are related to the same topic (e.g., movies, sports, news, etc.) or the same characters may be determined to have a higher level of similarity to one another than queries that are related to different topics or include different characters. A threshold may also be used to provide an indication that two or more query inputs include a sufficient level of content similarity to one another. Query inputs that are similar in both input context and content (e.g., meet a threshold level of similarity in input context and a threshold level of similarity in content) may be grouped with one another in a context cluster.

The process 300, for each of the context clusters, determines a context cluster probability that is based on the respective probabilities of entry of the query inputs that belong to the context cluster (306). As previously described, the similarity of the user context to the input context of the particular queries and/or context clusters may be used to determine a probability that the user will provide each query. The probability of each of the queries may be aggregated for the context cluster that the query is part of to obtain an aggregate probability for each context cluster (i.e., a context cluster probability). For example, a probability of providing the query "movie trailers" may be 1% and a probability of providing the query "movie show times" may be 2%. Consequentially, if these queries are grouped into a context cluster of "movies," then the aggregate probability for the context cluster of "movies" may be 3%. Further, a user query history may be provided by the user device 106 (or stored in the log data 114) that includes queries and contexts previously provided by the user, and this information may also factor into the probability that a user may provide a particular query or a query within a particular context cluster.

The process 300 receives an indication from the user device of a user event that includes data indicating a context of the user device (308). The context is independent of a query input at the user device. A user event may be determined to have occurred where there is an indication that the user is initiating a search query, for example, when a user on a user device 106 accesses a search engine website in a web browser. The indication can be received without the user actually entering any character or any other input into a search input field. When a user device 106 performs a user event to indicate the user is initiating a process of providing a search query (e.g., opening a web page associated with a search engine), the search system 110 and/or the context cluster system 210 may receive context of the particular user device 106. For example, the user device 106, at the time of the user event, may provide the user device's 106 location and user interests and preferences, and the date and time may be included in the input context of the user.

Flow diagram 300 also includes selecting, based on the context cluster probabilities for each of the context clusters, context clusters to provide for selection input (310). For example, in some implementations, context clusters that have a context cluster probability above a threshold context cluster probability may be included. However, in other implementations, other types of methods for selecting context clusters may be used.

In response to the selection, data that causes the user device to display a context cluster selection input that indicates the context cluster for user selection is provided to the user device (312). Once one or more context clusters are determined to be provided (e.g., meet an aggregate probability threshold), then the search system 110 and/or the context cluster system 210 may provide the one or more context clusters to the user device 106 for input selection (as shown in FIG. 1). If a context cluster is selected at the user device 106, then queries within that context cluster may be presented to the user device 106 for user selection as a query input. Such a query selection may be provided by the user without any character input by the user.

Figure 4A:
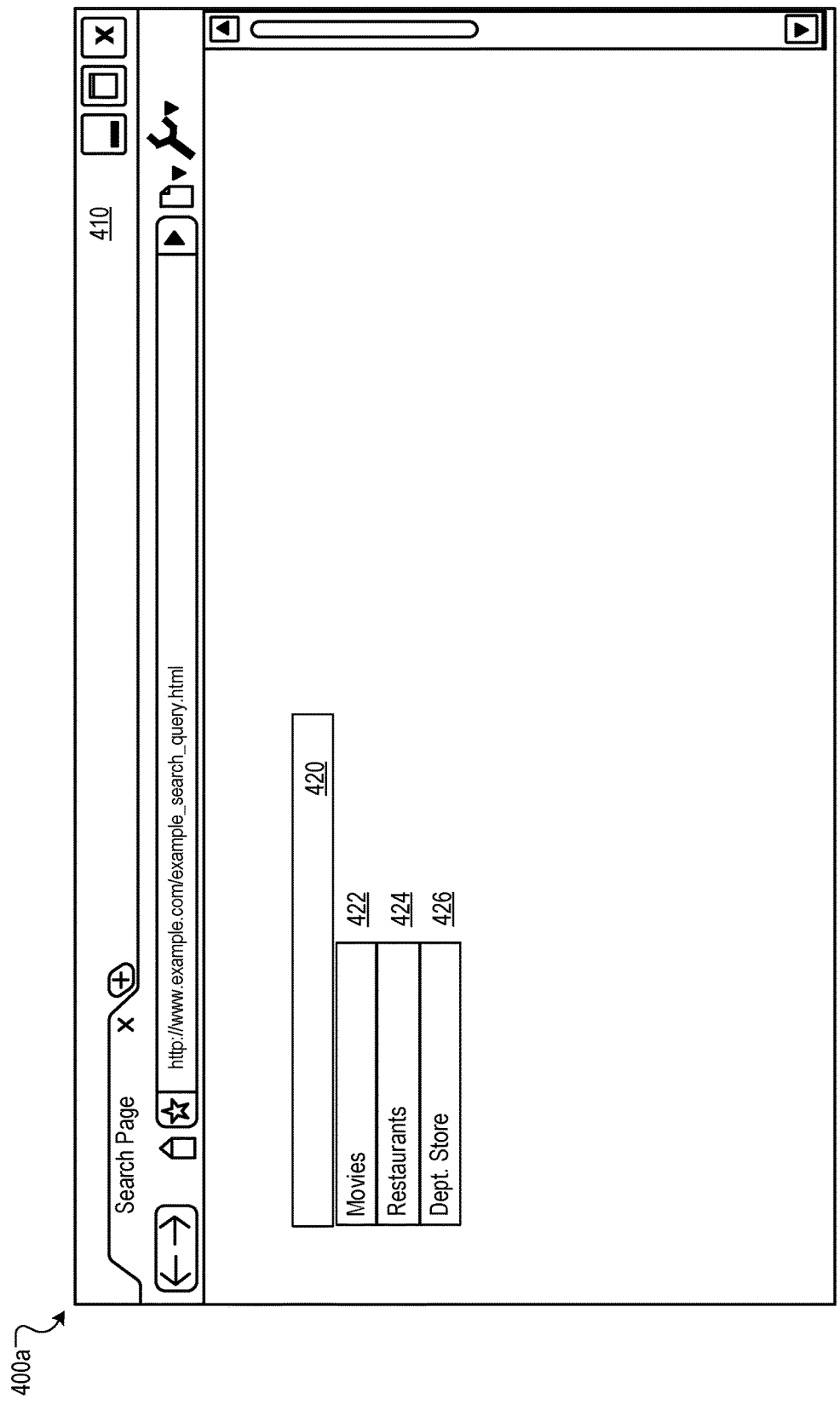
FIG. 4A is an illustration of an example user device user interface for displaying and selecting context clusters.
Figure 4B:
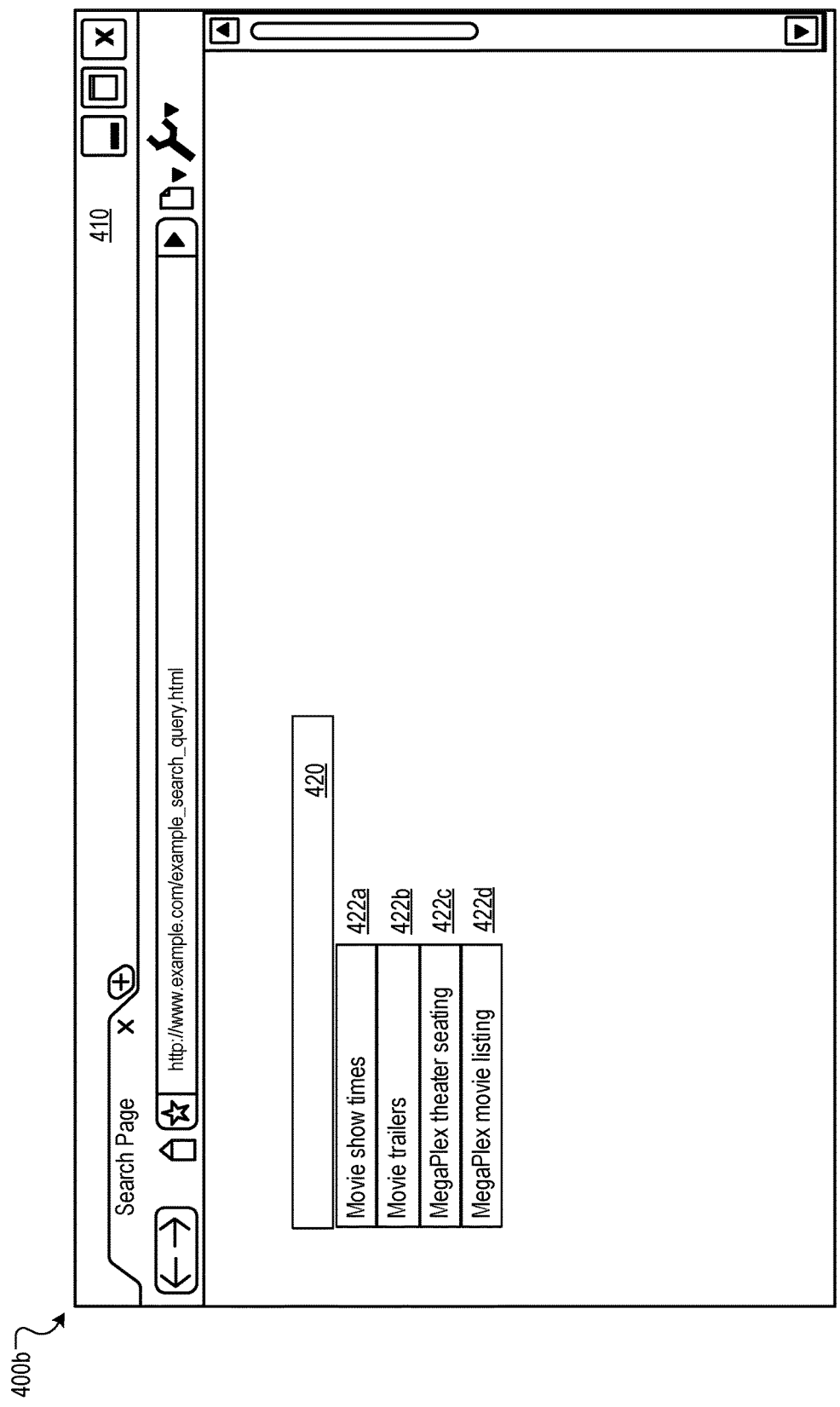
FIG. 4B is an illustration of an example user device user interface for displaying and selecting query inputs associated with the context clusters

FIGS. 4A-4B depict example user device user interfaces for displaying and selecting context clusters and query inputs associated with the context clusters. In the example user interface 400a of FIG. 4A, a user event has been performed (e.g., a user on a user device 106 accesses a search engine website in a web browser on a tablet device), and a search engine web site 410 is displayed in the display of the user device 106 along with a query input area 420. In the current example, the user may be in the location of MegaPlex, which includes a department store, restaurants, and a movie theater. Additionally, the user context may indicate that the user event was initiated on a Friday evening at 6 PM. Upon the user initiating the user event, the search system 110 and/or context cluster system 210 may access the content cluster data 214 to determine whether one or more context clusters is to be provided to the user device 106 as an input selection based at least in part on the context of the user. Based on the context of the user, the context cluster system 210 and/or search system 110 may determine, for each query in each context cluster, a probability that the user will provide that query and aggregate the probability for the context cluster to obtain a context cluster probability.

In the current example, there may be four queries grouped into the "Movies" cluster 422, four queries grouped into the "Restaurants" cluster 424, and three queries grouped into the "Dept. Store" cluster 426. Based on the analysis of the content cluster data 214, the context cluster system 210 may determine that the aggregate probability of the queries in each of the "Movies" cluster 422, "Restaurant" cluster 424, and "Dept. Store" cluster 426 have a high enough likelihood (e.g., meet a threshold probability) to be input by the user, based on the user context, that the context clusters 422, 424, and 426 are to be presented to the user for selection input in the search engine web site 410.

For example, the aggregate probabilities for the queries in the Movies" cluster 422 may be 5%, the aggregate probabilities for the queries in the "Restaurant" cluster 424 may be 4%, and the aggregate probabilities for the queries in the "Dept. Store" cluster 426 may be 3%. A threshold of 2% may be required for the context cluster to be presented to the user for selection input. An aggregate probability for the queries in a context cluster for a grocery store, for example, may only be 1%, based on the user context, so that context cluster may not be presented to the user as a selection input. Additionally, the order of the context clusters that are presented to the user, if there are more than one, may be ranked and presented based on the aggregate context cluster probability for the particular context cluster. However, in other implementations other selections for presentation may be used (e.g., randomized, alphabetical, among others).

In the example user interface 400b of FIG. 4B, the user selected the "Movies" cluster 422 from FIG. 4A, and the current query selection inputs are presented to the user in FIG. 4B. The query selection inputs in FIG. 4B include "Movie show times" 422a, "Movie trailers" 422b, "MegaPlex theater seating" 422c, and "MegaPlex movie listings" 422d. In the current example, these four query inputs were the query inputs in the "Movies" context cluster. However, in other implementation, more query inputs may be in the "Movies" context cluster, but only some of the query inputs may be presented to the user for query input selection after its respective context cluster is selected. For example, there may be a threshold query input probability that may be required for the particular query to be presented as a query input selection, or in some embodiments, the highest number (e.g., four) of queries in the context cluster may be presented to the user for query input selection. However, in other implementations, all of the query inputs within the context cluster may be presented for query input selection after the respective context query is selected by the user. Additionally, in some implementations, the order of presenting the query input selections may be based on a ranking of the probabilities of each of the query input selections of the context cluster.

From the example of the user interface 400b in FIG. 4B, the user may select one of the query input selections, and after the user makes the selection, the selected query input selection will be placed into the query input area 420 and sent to the search engine system 110 as a query. A query results page may then be presented to the user device 106 based on the results from the search engine system 110, and the user may interaction with the query results page. Such a query input may be performed without any input by the user in the query input area 420.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 5:
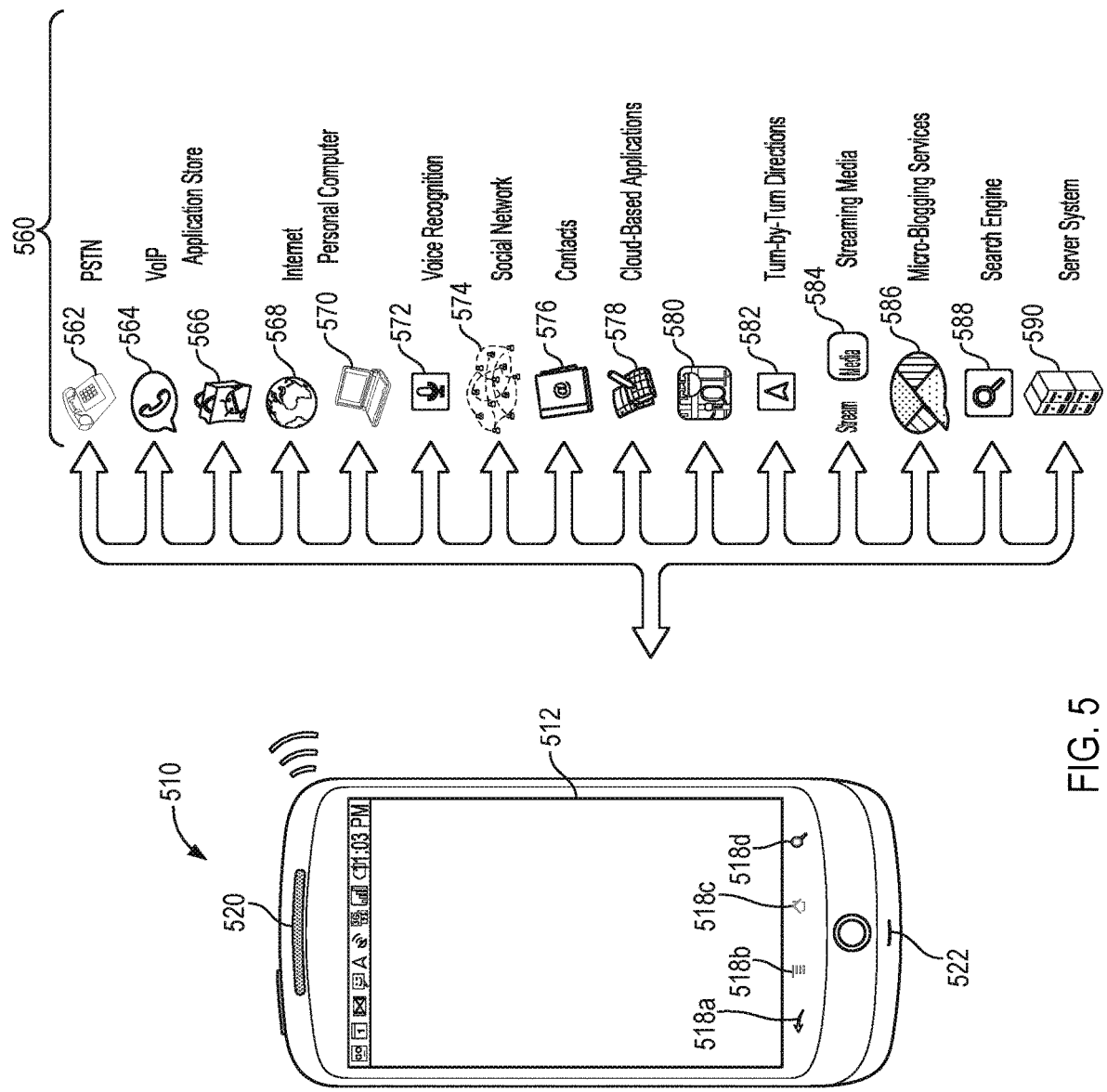
FIG. 5 is a block diagram of an example mobile computing device.

FIG. 5 is a block diagram of example mobile computing device. In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components.

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 820, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. User-selection of the button may invoke the pre-defined action.

The mobile computing device 510 may include other applications, computing sub-systems, and hardware. A voice recognition service 572 may receive voice communication data received by the mobile computing device's microphone 522, and translate the voice communication into corresponding textual data or perform voice recognition. The processed voice data can be input to the command models stored in the command models data 122 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 510. The mobile device 510 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 510 to the network 650 to enable communication between the mobile computing device 510 and other computing systems that provide services 560. Although the services 560 may be provided over different networks (e.g., the service provider's internal network, the Public Switched Telephone Network, and the Internet), network 650 is illustrated as a single network. The service provider may operate a server system 852 that routes information packets and voice data between the mobile computing device 510 and computing systems associated with the services 560.

The network 650 may connect the mobile computing device 510 to the Public Switched Telephone Network (PSTN) 562 in order to establish voice or fax communication between the mobile computing device 510 and another computing device. For example, the service provider server system 852 may receive an indication from the PSTN 562 of an incoming call for the mobile computing device 510. Conversely, the mobile computing device 510 may send a communication to the service provider server system 652 initiating a telephone call using a telephone number that is associated with a device accessible through the PSTN 562.

The network 650 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 650 and install on the mobile computing device 510. The application store 566 may serve as a repository of applications developed by third-party application developers. An application program that is installed on the mobile computing device 510 may be able to communicate over the network 650 with server systems that are designated for the application program. For example, a VoIP application program may be downloaded from the Application Store 566, enabling the user to communicate with the VoIP service 564.

The mobile computing device 510 may access content on the internet 568 through network 650. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 650. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program.

Mapping service 580 can provide the mobile computing device 510 with street maps, route planning information, and satellite images. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   sending, from a user device to a search system, data indicating the user is accessing a search resource and that further indicates the user has not provided a query input to the search resource;
   sending, from the user device to the search system, data indicating a location of the user device;
   receiving, at the user device and from the search system, data indicating a plurality of query inputs based, in part, on an input location for each of the query inputs, and each query input has an associated probability that it will be selected by the user when the user is at a location that corresponds to the location, and wherein the query inputs are each selected by the search system based on the probabilities for each query input and the location of the user device; and
   presenting, at the user device, data indicating the plurality of query inputs.

2. The computer-implemented method of claim 1, further comprising:
   sending, from the user device to the search system, data indicating a selection of the one of the query inputs of the plurality of query input;
   receiving, at the user device and from the search system, additional query inputs based on the selected query input; and
   displaying, at the user device, data indicating the one or more additional query inputs.

3. The computer-implemented method of claim 2, wherein the query inputs of query inputs are determined by:
   determining query similarity measures for the query inputs, where each query similarity measure measures a similarity of at least two query inputs; and
   grouping the query inputs based on the query similarity measures.

4. The computer-implemented method of claim 1, wherein the probability for each query input is determined by:
   determining, for each query input, a probability of entry of the query input at a user device.

5. The computer-implemented method of claim 1, wherein the search resource is a search engine interface, and presenting data indicating the plurality of query inputs comprises displaying, in the search engine interface, the data indicating the plurality of query inputs.

6. The computer-implemented method of claim 1, wherein the search resource is a search assistant, and presenting data indicating the plurality of query inputs comprises generating a voice output that describes the plurality of query inputs.

7. A user device, comprising:
   a processor; and
   a computer-readable medium coupled to the processor and having instructions stored thereon, which, when executed by the processor, cause the processor to perform operations comprising:
   sending, from a user device to a search system, data indicating the user is accessing a search resource and that further indicates the user has not provided a query input to the search resource;
   sending, from the user device to the search system, data indicating a location of the user device;
   receiving, at the user device and from the search system, data indicating a plurality of query inputs based, in part, on an input location for each of the query inputs, and each query input has an associated probability that it will be selected by the user when the user is at a location that corresponds to the location, and wherein the query inputs are each selected by the search system based on the probabilities for each query input and the location of the user device; and
   presenting, at the user device, data indicating the plurality of query inputs.

8. The system of claim 7, the operations further comprising:
   sending, from the user device to the search system, data indicating a selection of the one of the query inputs of the plurality of query input;
   receiving, at the user device and from the search system, additional query inputs based on the selected query input; and
   displaying, at the user device, data indicating the one or more additional query inputs.

9. The system of claim 8, wherein the query inputs of query inputs are determined by:
   determining query similarity measures for the query inputs, where each query similarity measure measures a similarity of at least two query inputs; and
   grouping the query inputs based on the query similarity measures.

10. The system of claim 7, wherein the probability for each query input is determined by:
   determining, for each query input, a probability of entry of the query input at a user device.

11. The system of claim 7, wherein the search resource is a search engine interface, and presenting data indicating the plurality of query inputs comprises displaying, in the search engine interface, the data indicating the plurality of query inputs.

12. The system of claim 7, wherein the search resource is a search assistant, and presenting data indicating the plurality of query inputs comprises generating a voice output that describes the plurality of query inputs.

13. A computer-readable medium having instructions stored thereon, which, when executed by a data processing apparatus, cause the data processing apparatus to perform operations, comprising:

sending, from a user device to a search system, data indicating the user is accessing a search resource and that further indicates the user has not provided a query input to the search resource;

sending, from the user device to the search system, data indicating a location of the user device;

receiving, at the user device and from the search system, data indicating a plurality of query inputs based, in part, on an input location for each of the query inputs, and each query input has an associated probability that it will be selected by the user when the user is at a location that corresponds to the location, and wherein the query inputs are each selected by the search system based on the probabilities for each query input and the location of the user device; and presenting, at the user device, data indicating the plurality of query inputs.

\* \* \* \* \*